United States Patent [19]
Jeter

[11] 3,958,678
[45] May 25, 1976

[54] ROLLER CLUTCH
[75] Inventor: John Doise Jeter, Dallas, Tex.
[73] Assignee: Texas Dynamics, Inc., Dallas, Tex.
[22] Filed: Apr. 1, 1974
[21] Appl. No.: 456,623

[52] U.S. Cl. ................................. 192/44; 192/45; 308/6 C
[51] Int. Cl.² ..................... F16D 41/08; F16C 19/08
[58] Field of Search ................. 192/44, 45; 308/6 C

[56] References Cited
UNITED STATES PATENTS

| | | | |
|---|---|---|---|
| 2,860,750 | 11/1958 | Avanzati | 192/44 |
| 2,884,101 | 4/1959 | Warn | 192/44 |
| 3,037,821 | 6/1962 | Schutz | 308/6 C |
| 3,357,754 | 12/1967 | Betrix | 308/6 C |
| 3,808,839 | 5/1974 | Teramachi et al. | 308/6 C |

*Primary Examiner*—Allan D. Herrmann

[57] ABSTRACT

A roller clutch is provided that is capable of transmitting rotational forces between a first and second machine member. The first member is a cylindrical member such as a shaft, having a smooth outer surface. The second member includes a housing through which the shaft extends. A plurality of rollers are located between the housing and the shaft to transmit rotational forces between the shaft and housing while allowing the shaft to move axially relative to the housing.

15 Claims, 20 Drawing Figures

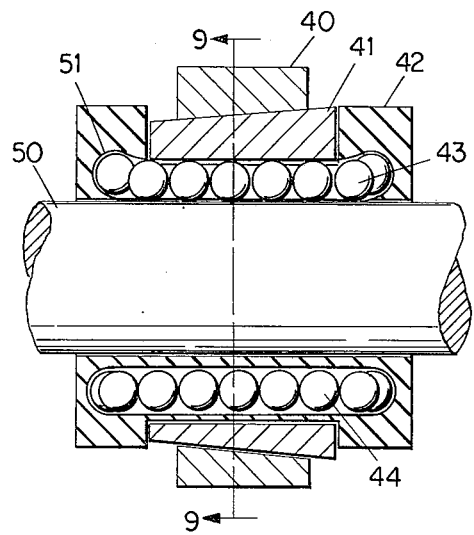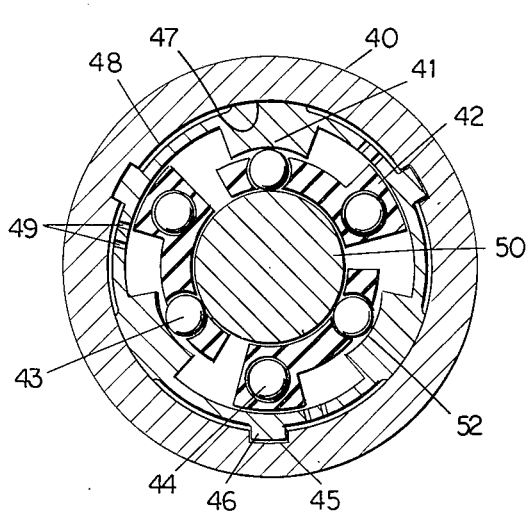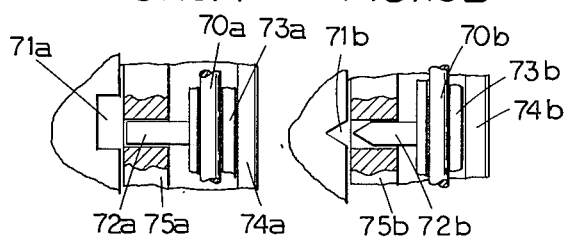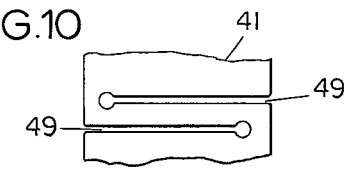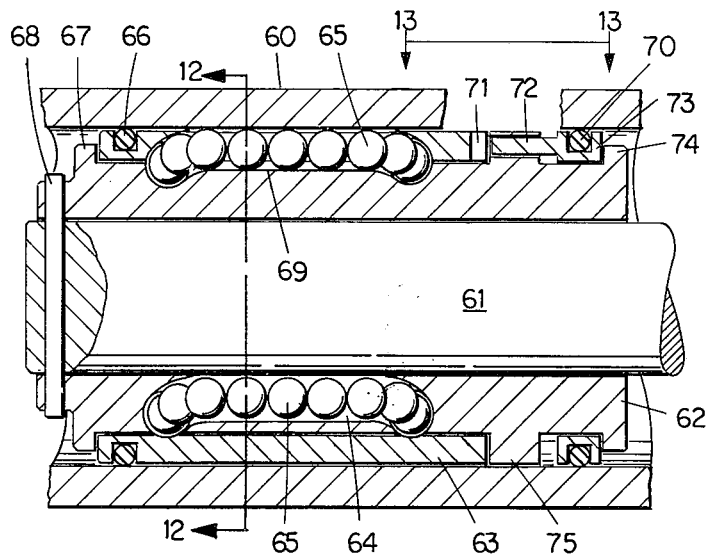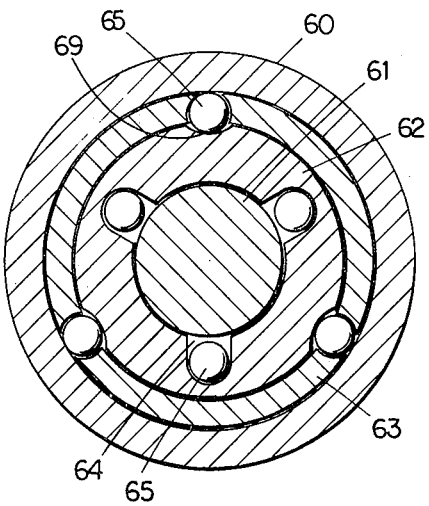

ROLLER CLUTCH

BACKGROUND OF THE INVENTION

This invention relates to clutches generally, and in particular to clutches that employ rollers to control the transmission of torque between the driving and the driven member.

There are many occasions where it would be useful to transmit torque to a driven member, such as a shaft, while allowing axial movement of the shaft relative to the driving member by applying rotating effort directly to the smooth surface of the shaft. For example, in drilling operations where the drill string that drives the bit is made up of a plurality of sections that are connected together by threads, torque is transmitted to the drill string to rotate the bit through a specially shaped upper section having a non-cylindrical outer surface. In other words, the driving member or Kelly is usually square or hexagonal in cross section and is located in a square or hexagonal opening in a drive bushing. The length of the non-cylindrical drive member limits the distance the drill can advance before another section has to be placed in the drill string at which time the drill string has to be moved out of the well bore or drill hole far enough to allow the driving member or Kelly to be unscrewed from the drill string and another section of drill pipe connected into the drill string.

It would be advantageous if the special drive section of a drill string could be eliminated thereby allowing sections of drill string to be continuously added to the drill string without raising the bit away from the bottom of the drill hole and without requiring the special drive section located at the top of the drill string, and it is an object of this invention to provide a clutch that will transmit torque to a member having a smooth cylindrical outer surface, such as drill pipe, while allowing axial movement of the drill string through the clutch.

It is another object of this invention to provide a clutch for driving a member having a smooth outer surface that can be quickly and easily engaged or disengaged to drive the member in one direction or in the opposite direction as desired.

It is a further object of this invention to provide a clutch for providing torque to a member having a smooth surface that can be quickly and easily disengaged to allow free rotation of the drill member relative to the driving member.

It is a further object of this invention to provide such a clutch that can be adapted to engage an external smooth, cylindrical surface for rotating such a member while allowing the free axial movement of either member relative to the clutch.

It is a further object of this invention to provide a circulating roller clutch that is adjustable to transmit torque to cylindrical bodies of various diameters.

These and other objects, advantages, and features of this invention will be apparent to those skilled in the art from a consideration of this specification, including the attached drawings and appended claims.

BRIEF DESCRIPTION OF DRAWINGS

FIG. 8 is a longitudinal sectional view of an alternate embodiment of the clutch of this invention;

FIG. 9 is a sectional view taken along line 9—9 of FIG. 8;

FIG. 10 is a view in elevation of the outer surface of one of the internal members of the device in FIGS. 8 and 9;

FIG. 11 is a longitudinal sectional view of an alternate embodiment of the clutch of this invention for engaging the inside cylindrical surface of a driven member;

FIG. 12 is a sectional view taken along line 12—12 of FIG. 11;

FIG. 13a is a view partly in section and partly in elevation looking in the direction of arrows 13—13 of FIG. 11;

FIG. 13b is an alternate embodiment of the apparatus of FIG. 13a;

DETAILED DESCRIPTION

Figure 1:
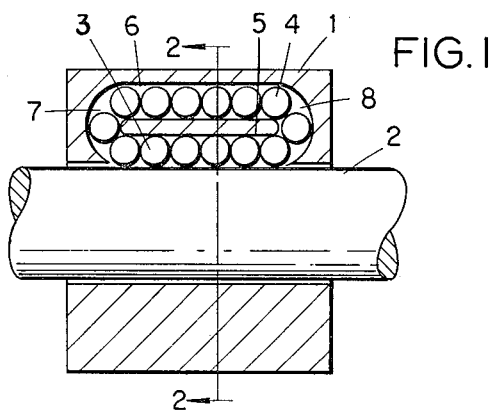
FIG. 1 is a longitudinal sectional view of one embodiment of this invention for rotating a shaft in either direction while allowing axial movement of the shaft.
Figure 2:
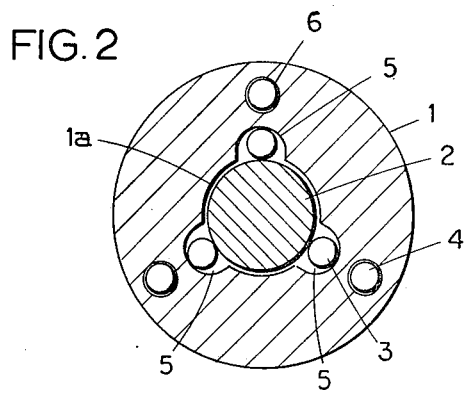
FIG. 2 is a sectional view taken along lines 2—2 of FIG. 1.

In the embodiment shown in FIGS. 1 and 2, two machine members, body or housing 1 having opening 1a through which shaft 2 extends, are prevented from relative rotation by a plurality of rollers 3. The rollers can be any desired shape as long as they can roll in at least one direction, such as elongated cylinders or spherical balls. In the embodiment shown rollers 3 are spherical balls. The balls are located in a channel in one of the members which is shaped to provide a surface that will cause the balls to prevent relative rotation between the members, ie, body or housing 1 and shaft 2 of FIG. 1.

In the embodiment shown, three such channels are used. The channels are designated by the number 5 and are equally spaced around opening 1a in housing 1. Each channel 5 is shaped such that, from a maximum radial clearance from shaft 2 sufficient to accept roller 3, said clearance decreases with peripheral distance, about shaft 2, from a radial line at maximum clearance. As relative rotation occurs between 1 and 2, balls 3 roll between 1 and 2 along the periphery of 2 into the reducing clearance of channel 5. The reducing radial clearance of 5 contacts each ball 3 at two points that are not in radical alignment from the longitudinal axis of the shaft. As the radial load, due to the pinching action of the reducing clearance between the shaft and the surface of channel 5 is imposed compressively on balls 3 between said two points, a peripheral component and a radial component of force can be resolved from the force vector between said two points. The peripheral force component is directed to oppose the relative rotation between the shaft and the housing. The rate of change in clearance between the surface of channel 5 and shaft 2 is somewhat critical. This rate of change at any selected point on the surface of shaft 2 may be called an angle as measured from a tangent to the surface. If the angle is too acute, the ratio of radial component to peripheral component may cause a destructive radial load to be transmitted by the balls within achievable peripheral forces tending to rotate 2 relative to 1. If the angle is too obtuse, the ratio of radial to peripheral forces, in conjunction with the coefficient of friction between the balls and either the housing or the shaft will not be great enough to keep the balls from slipping on the surfaces in contact, and the desired positive clutch action will not be obtained.

In accordance with this invention, a clutch is provided for transmittng torque to a member having a smooth cylindrical surface while allowing axial movement of the member relative to the clutch. Therefore, means are provided for allowing balls 3 to roll in the direction of axial movement while holding said members from relative rotation. In the embodiment shown, three ducts or bores are provided in housing 1. Each duct is spaced from and generally parallel to one of the elements. The ends of the channels are connected to the ends of the ducts by radially extending curved openings or bends 7. The conduits are filled with balls 3 so that all the balls move together and there is a constant number in each channel between the body and the shaft as the balls circulate or move around the conduit.

The recirculating action of the rollers of FIG. 1 would be as follows: Assume shaft 2 is moving left relative to body 1. Rollers 3 may be transmitting radial forces and peripheral forces between 1 and 2. Rollers such as 3 will move left in channel 5 at half the linear speed of shaft 2 relative to 1. The rollers will in turn move around bend 7 and move with no load along return bore 6, move around bend 8 and again enter channel 5.

In small devices requiring little torque transmitting ability, one of the roller loops shown in FIG. 1 could serve the intended purpose if body 1 represents a close fitting bearing about shaft 2, so that the radial load transmitted by the rollers between the body and shaft is opposed by the bearing surfaces without disruptive distortion. Normally the equalizing and stabilizing effect of a plurality of roller loops will be desirable, such as the three loops used in this embodiment.

Figure 3:
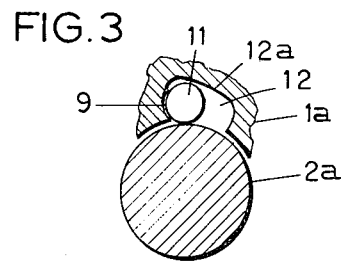
FIG. 3 is a fragmentary sectional view on an enlarged scale of an alternate driving arrangement for the clutch of FIGS. 1 and 2.

FIG. 3 shows a sectional profile of a channel that will provide an overruning or one-way clutch action. Here, assume body 1a fixed. If shaft 2a is rotated clockwise, roller 11 will move against inclined surface 12a of channel 12 and inhibit further clockwise rotation of shaft 2 by jamming or pinching action. If shaft 2 tends to rotate conterclockwise roller 11 will move left against abutment 9. This position of 11 against 9 is in an area of the channel which allows sufficient clearance for roller 11 to roll freely as shaft 2 rotates.

The description of the preferred embodiment is best preceeded by an awareness of the shortcomings of the simple device of FIGS. 1, 2, and 3. Assume high speed rotation of body 1 and shaft 2. If no tendency for relative rotation between 1 and 2 exists, rollers 3 will not be pinched in recess 5 and will move freely to the maximum radial position in 5 due to centripetal forces. If the dimensions of the system are such as to allow clearance between shaft 2 and rollers 3 when rollers 3 are centered in recess 5, shaft 2 may then rotate relative to body 1 without engaging rollers 3. The clutching action at these conditions may not occur.

If there is clearance between shaft 2 and rollers 3 when the rollers are in the maximum clearance areas of recess 5, then the spinning slows down, gravity can influence the uncontrolled position of 3 within 5. This can cause some rollers to reach the pinch region of 5 sooner than others when relative motion between 2 and 1 brings the clutching rollers into action. This may distort the system, especially in high speed machinery.

If the recesses 5 are of hardened steel, for instance, the roller recirculating conduits 6 are hard to machine and complicate heat treatment.

Rollers moving through return ducts 6 approaching the clutch action region of recess 5 are not directed to the pinch region being traversed by the preceding roller, and the newly engaged roller may not carry as much load as the preceding roller. Rotational creep then may accompany axial relative motion between shaft 2 and body 1.

Irregularities in shaft 2 may allow rollers 3 to move farther into the pinch region of 5 causing jamming as the roller is induced to move axially along the surface of shaft 2 where no such irregularities exist.

Figure 4:
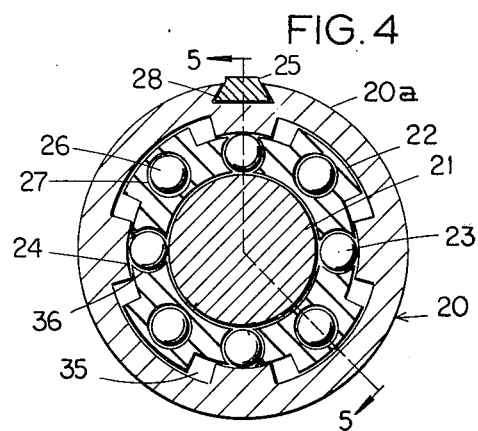
FIG. 4 is a cross sectional view of the preferred embodiment of the invention.

The preferred embodiment of FIG. 4 is intended to overcome the detriments outlined above. In this embodiment the housing or body includes a roller control cage. Since it may be desirable to provide a clutch action option selector to control the ball control cage, such a selection is included in this embodiment. In most applications, however, it is known in advance what clutch action is desired and this will be a design feature with no option provided in application. Options presented include (1) no clutch action in either direction of relative rotation, (2) clutch action in both directions of relative rotation, and (3) choice of one-direction clutch action in either direction of relative rotation. FIGS. 4, 5, 6 and 7 contain the machine elements and are provided corresponding reference numbers.

As shown in FIG. 4, body 20 includes member 20which is disposed about shaft 21 and roller or ball control cage 22 which is disposed about shaft 21 and, within limits, is free to rotate about shaft 21 and relative to member 20a. Clutch force pads 24 are attached to member 20a and spaced a distance from the cylindrical surface of 21 such that balls 23 may pass axially between shaft 21 and body 20. Here four such pads are provided, distributed around the axis of shaft 21. In this embodiment four closed-end conduits are provided for balls 26. Each conduit includes axial passage 36, a return bend at each end and a return duct 27. There is no reason not to provide serpentine loops such that an individual roller may course through all pad-shaft passages, each bend and return duct in series. For descriptive simplicity four independent closed loops will be assumed.

Figure 7:
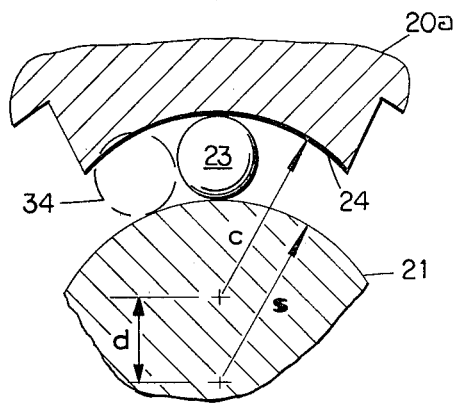
FIG. 7 is a cross sectional view of an enlarged scale of the driving connection of the clutch of FIG. 4.

There probably exists an ideal configuration for clutch force pads, viewed in transverse section. Such an ideal configuration should produce a constant reduction in radial distance between shaft and pad with each unit of peripheral travel about the shaft. This results in a complex profile for the pad and is hard to machine. A suitable cylindrical surface for the pad should, with limited peripheral travel of the rollers in a reasonably rigid system, serve the intended purpose of pinching the roller against the shaft to induce clutching. FIG. 7 is used to describe such a surface when one clutch force pad 24 and a portion of shaft 21 is shown on an enlarged scale. The cylindrical surface of shaft 21 has radius $s$. At a distance $d$ from the shaft centerline is the origin of radius $c$, which defines the radius of curvature of pad 24. When radius $s$ coincides in direction with radius $c$, passing through the origin of $c$, the magnitudes $c + d - s$ should equal the diameter of ball 23 and ideally provide slight clearance for the ball. When ball 23 moves in a peripheral direction about shaft 21 it encounters reducing radial clearance. Intereference between ball 23 and shaft 21 and pad 24 is shown by phantom ball 34 which is peripherally displaced. Clutching action is seen to occur within the peripheral limits of pad 24.

Figure 5:
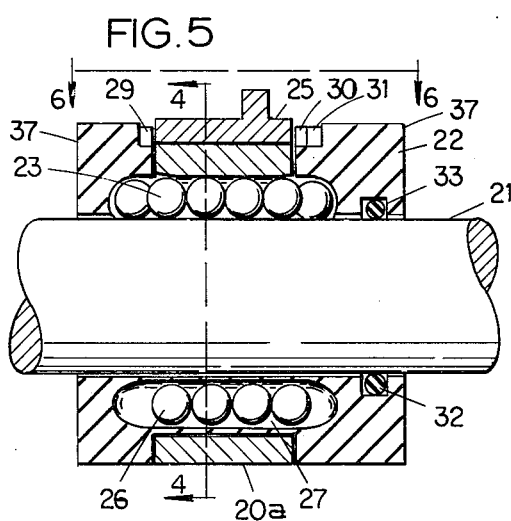
FIG. 5 is a sectional view taken along lines 5—5 of FIG. 4.
Figure 6:
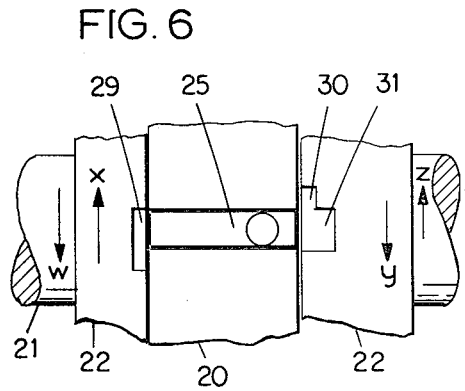
FIG. 6 is a view in elevation of a portion of the device of FIG. 5 looking in the direction of arrows 6—6.

Ball control cage 22 is of one piece construction and as shown in FIG. 4 is so contoured in transverse section as to expose balls 23 in passage 36 in the areas of shaft 21 and pad 24. Hubs 37 on each end contain the ball loop bends. Radial recess 35 in member 20a provides clearance for a lobe on cage 22 for a closed duct 27 for ball return. Referring to FIG. 5, assume shaft 21 moves left. Balls 23 roll between the surface of the shaft and the surface of pad 24, allowing axial motion of shaft 21 but jamming more positively as they move more peripherally, if shaft 21 tends to rotate, preventing further relative rotation between member 20a and shaft 21. Balls 23 move to the left at about half the rate of the shaft. As balls 23 roll into the pinch area between 21 and 24, the cage 22, fitting the balls closely, moves the passage 36 to provide an axial path for balls 23 rolling axially along the pinch area. This provides reasonably uniform ball loading. As the balls reach the end of 24, they are relieved of radial load and move freely around the bends in the hub 37. Return balls are shown as 26 rolling to the right along duct 27. At the right return bend, the balls are guided by the bend in the right hub, 37 and are directed by cutaway passge 36 into the pinch area of pad 24, each ball following the preceding ball and receiving load between pad 24 and shaft 21. In practice, this entry into the pinch area will probably be made gradual by a bell-like shape at the entry. To compensate for creep and to reduce the tendency for the balls to jam, the pads 24 and passages 36 may be somewhat spiral. Clutch pads can be formed to spiral about the shaft to induce a particular relationship between the axial movement of the shaft and the rotation of the shaft.

The hub 37 is shown with optional drag groove 33 in which is situated an O-ring 32 as a drag means. As shaft 21 rotates relative to body 20, the drag means 32 tends to cause cage 22 to rotate with shaft 21. This moves all passages 36 peripherally in unison to bring all balls between shaft 21 and pad 24 into the pinch zone and load all such balls uniformly. If passage 36 should be constrained against rotation relative to member 20a, and positioned in the area of maximum clearance between shaft 21 and pad 24, the balls 23 would not receive pinch loads, and would roll freely within passage 36. No clutching action would occur. Referring to FIG. 7, if ball 23 were permitted to move to the right upon being urged right but stopped in the center as shown on being urged left, then shaft 21 would be clutched against clockwise rotation but would be free to rotate counterclockwise. If conversely, ball 23 were permitted to move left when urged left but stopped in the center as shown on being urged to the right, then shaft 21 could freely rotate clockwise but would be clutched against counterclockwise rotation as viewed.

To accomplish the clutch action options described above, body 20a is provided with dovetail slot 28 into which slide 25 is slidably situated. Slide 25 can be moved axially left into slot 29 in hub 37. This allows cage 22 to move only in the direction of arrow $x$. Cage 22 is stopped with the passage 36 in the middle of pad 24 when the hub 37 is urged in the opposite direction. This allows shaft 21 to rotate only as shown by arrow $w$. With slide 25 in the neutral position shown in FIG. 6, the ball control cage 22 will move as urged by the shaft 21 through drag 32. Clutching then occurs in either direction the shaft tends to rotate. If slide 25 is moved slightly to the right slot 30 is engaged in the hub 37. The ball control cage then may move in the direction of arrow $y$ but will be stopped against rotation past neutral in the opposite direction. Shaft 21 then can rotate only as shown by arrow $z$. If slide 25 is moved farther right to engage slot 31 in hub 37, the balls 23 are held in all cases in the maximum clearance area of pad 24 and shaft 21 is free to rotate in both directions. In all cases shaft 21 may move in the axial directions.

In the actions described above it is assumed that radial displacement loads do not bear between the shaft and the rest of the device to a detrimental extent. Bearing systems currently available to accommodate radial loads with both axial and rotational relative motion may be employed in many different embodiments to protect the invention.

Ball control cage 22 is shown of elastomer material and in light applications can accommodate radial bearing loads as a bushing against the shaft and bearing against 20a.

For heavier radial side loads such as gravity might impose due to a heavy horizontal shaft, only slight modifications of the pads of FIG. 7 are required. The dimension $d$ may be reduced to zero for a portion of the length of the channels. Balls 23 then operating in the annular space between the cylinder of $s$ radius and the cylinder of $c$ radius may move peripherally as required to hold shaft 21 concentric with the cylinder described by the pads 24. Very likely, in practice, the balls will have less clearance between the shaft and the bearing area of pads 24 as contrast to the maximum clearance between the clutch areas of pad 24 and the shaft 21, so that bearing and clutch may serve their separate functions without mutual intereference.

In the embodiment of FIG. 8 and FIG. 9 the invention is adapted to provide radial adjustment to accommodiate variations in the size of the shaft or tube being clutched. Machine member 40 has a tepered bore 48 matching the tapered outside 47 of member 41. Member 41 has slots 49 (shown more clearly in FIG. 10) which permit peripheral expansion and contraction. Clutch pads 52 are radially opposed to bearing surface 47 bearing against bore 48. Key 46 of member 41 rides in keyway 45 of member 40 to prevent relative rotation between 40 and 41. Axial relative motion between member 40 and member 41 will change the effective diameter of the clutch pads 52. The effective diameter of pads 52 with balls 43 in the neutral clutch position determines the size of shaft 50 which may be used.

There is no rotational bias or rotational control of the ball control cage 42 shown but this method is disclosed by the device of FIG. 4 and can be applied to the device of FIG. 8. The ball control cage 42 is shown to be an elastomer or material such as nylon to accommodate the adjustemnt feature of FIG. 8. This is by no means intended to be restrictive.

It is often desirable to grip a smooth bore of a machine member for rotational effort transmission. The device of FIG. 11 and FIG. 12 will accomplish this while permitting relative axial motion between the smooth bore and the clutching device. Shaft 61 and body 62 may be integral but are shown pinned together by pin 68. Ball control cage 63 serves to retain balls 65 in the absence of member 60. Cage 63 is retained axially on body 62 by shoulders 67 and 75. In this case return balls 65 are routed through body 62 by way of tunnels 64. Clutch pads 69 are formed directly in body 62. Drag means 66 transmits rotational effort to 63 in response to rotation of member 60 relative to 62. This device is used to disclose a clutch action option selector that is responsive to axial motion of member 60 relative to body 62. Drag means 70 in collar 73 manipulates control rod 72, extending through shoulder 75. A plurality of such rods may be used. Control rod 72 engages notch 71 in ball control cage 63. In FIG. 11, if member 60 is moved right relative to body 62, the drag 70, collar 73 and rod 72 are to the right and cage 63 is not controlled. If member 60 is moved left relative to body 62, drag means 70, collar 73 and rod 72 will be to the left travel limit of collar 73. Control rod 72 will engage slot 71 in control cage 63. Rod 72 will control cage 63 in the manner elected by the configuration of notch 71 and rod 72. Two possible configurations are shown in FIGS. 13A and 13B. The configuration of FIG. 13A will, when member 60 is moved left, prevent rotation of 60 counterclockwise relative to body 62 as viewed in FIG. 12, but will permit opposite relative rotation. In accordance with FIG. 13B, rod 72b will, when member 60 moves left, prevent relative rotation of cage 63 in both directions. Member 60 then can rotate in either direction as member 60 moves left as viewed in FIG. 11.

It is readily evident that the option control as described above can be installed on either or both ends of body 62 and obviously may be omitted.

The device of FIGS. 11 and 12 may be combined with a hydraulic or pneumatic piston means. Body 62 can be adapted to utilize pressure packing in sliding contact with the bore of member 60, thus serving both the clutch and piston function.

Figure 14:
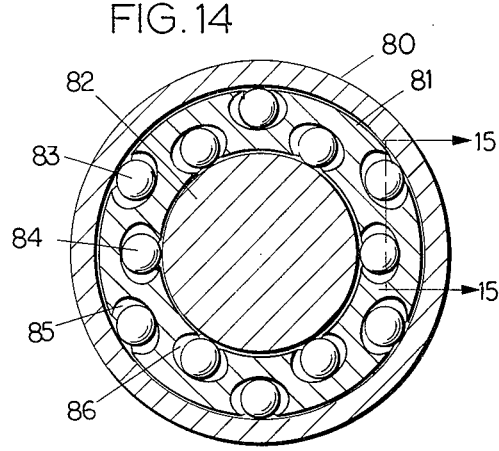
FIG. 14 is a transverse sectional view of an alternate embodiment of this invention adapted to operate between a tube and a smaller coaxial cylinder.
Figure 15:
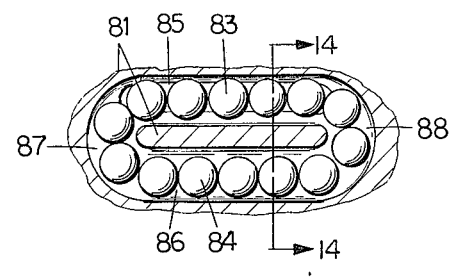
FIG. 15 is a partial sectional view of the device of FIG. 14 taken along line 15—15 of FIG. 14.

The device of FIG. 14 is intended to provide a linear rolling ball clutch to rotationally couple a smooth cylinder inside a smooth bore to said bore. Cylinder 82 is generally concentric with the bore of tube 80. A combined clutch and ball control cage 81 contains one or more ball circulation loops as shown in FIG. 15. Each clutching channel such as 85 and 86 is bidirectional in clutch action. A unidirectional shape as shown in FIG. 3 may be used. Alternately, one group, say the outside, recesses may be unidirectional, the inside recesses being bidirectional or conversely. As shown in FIG. 14 inside clutch channels 86 are return ducts for outside clutch channels 85. This means that axial relative motion between tube 80 and cylinder 82 produces half as much relative motion between cage 81 and both tube 80 and cylinder 82. This may be undesirable if the device is intended to operate, for instance, at the rod gland end of a fluid power cylinder. To retain the general configuration of FIG. 14 but allow the device to remain axially stationary relative to one principal member, say tube 80, little alteration is required. There are six inner channels 86. Three may be dispensed with by reshaping the alternate clutch channel 86 to give the balls 84 free rolling clearance in the alternate channel. The alternate outside clutch channels 85 may be altered to allow free return circulation of balls 83. Cage 81 may then be subject to axial motion and control independent of the tube 80 and cylinder 82. The ball circulation loops then may be of serpentine configuration if desired, such that any one ball will, with enough axial motion of tube 80 relative to cylinder 82, course trhough all channels. For a clutch control cage 81 axially stationary relative to tube 80 or cylinder 82, the axially stationary clutch rollers need not circulate, and may be cylindrical instead of spherical as shown.

Figure 16:
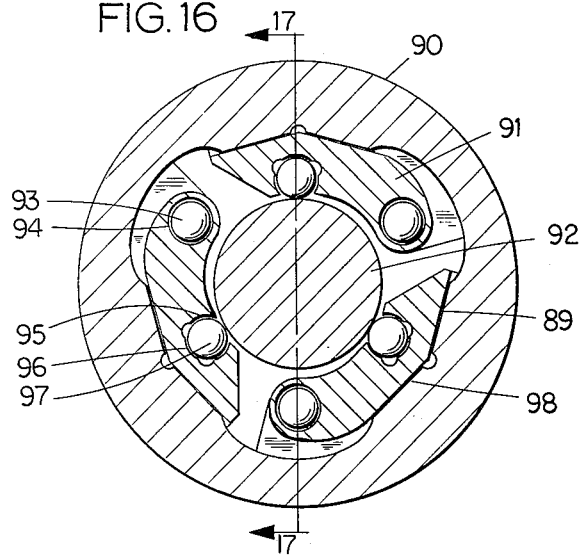
FIG. 16 is a transverse sectional view of another embodiment of the clutch of this invention.
Figure 17:
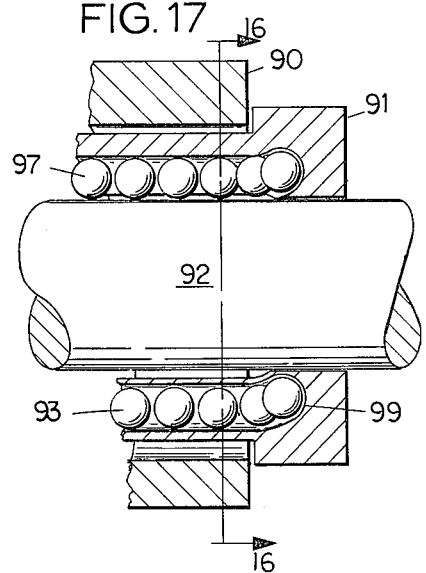
FIG. 17 is a partial sectional view taken along line 17—17 of FIG. 16.

In the shaping of ball clutch channels, the points of contact on the ball imposed by the two principal members are not diametrically opposite when the ball is moving peripherally into a pinch region. This complicates the axial rolling action of the ball. The ball tends to spin about a line between these two contact points In the utilization of resilient balls, they tend to climb out of the pinch region in a peripheral direction as they move axially. Although the ball control cages, particularly if biased into the pinch, reduce this spinning, some rotational creep does accompany axial motion and is somewhat proportional to the transmitted torque. In some applications this is undesirable. More undesirable than the creep is the tendency for the creep to vary widely with a variety of changing parameters. The device of FIGS. 16 and 17 offers an alternate stabilizing method. Rotational forces are transmitted between shell 90 and shaft 92 by way of cage element 91 acting through balls 97. The cage element 91 contains an independent ball circulating loop and remains intact in the absence of shell 90 or shaft 92 or both. This embodiment is preferred in large and rugged installations such as well drilling drill string drives. The plane surfaces 89 and 98 serve two functions. For descriptive convenience consider the rotational centerline of 92 to be the longitudinal axis of the system and consider it to be vertical relative to earth. For descriptive convenience consider planes 89 and 98 to intersect in a line that lies in a radial plane containing the centerline of 92. In the drilling application the angle of convergence between said intersection line and the centerline of shaft 92 appears to serve best at about 5°. Cage element 91 may be dropped by gravity into the position shown. In this illustration, shaft 92 is a drill string section and shell 90 is a rotary drive bushing. As cage element 91 moves vertically downward balls 97 move radially inward to contact shaft 92 and the plane surfaces 89 and 98 on cage 91 and shell 90 are in engagement. FIG. 16 is viewed from below in the illustrated earth drilling situation. The device of FIG. 16 is an effective linear antifriction circulating ball bearing. In rotary work as viewed in FIG. 16, shell 90 rotates counterclockwise. Drill string shaft 92 resists such rotation and imposes a clockwise peripheral force on balls 97. This peripheral force tends to slide cage element 91 clockwise at the bearing plane 98. This sliding action reduces the distance between the center of balls 97 and the center of shaft 92 until the balls 97 move far enough due to the sliding at plane 98 for the center of the balls 97 to coincide with a radial plane perpendicular to 98 and containing the centerline of 92. Unless shaft 92 crushes, this degree of sliding at plane 98 is not accomplished before the required torque is transmitted between shell 90 and shaft 92. The balls in circulation move as 97 in clutching action, around bend typified by 99, and return as balls 93 in duct 94, within cage element 91, allowing axial motion of shaft 92 within shell 90. This is quite similar to the circulation shown in FIG. 15. Resilient balls appear to perform well in channels shaped as shown at point 96 and point 95 with copious lubrication. Hardened balls, however, are best retained in clutch channels shaped as in FIG. 19. In summary of the action of this device, due to vertical sliding of cage element 91 down planes 89 and 98, radial adjustment of cage 91 is accomplished. Torque then transmitted from shell 90 to shaft 92 through cage 91 and balls 97 begins to influence radial clutching loads with known geometry within moderate changes in the diameter of shaft 92. The angles and relationships of planes in the above description are offered by way of illustration and are in no way restrictive.

Prevalent in the foregoing device description is the lost motion in rotation between the driving and driven members in bringing the clutch rollers from neutral position into the pinch areas for clutching action.

Figure 18:
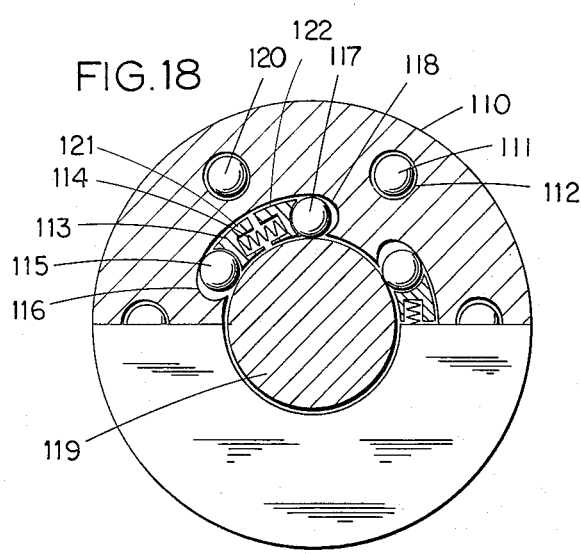
FIG. 18 is a transverse sectional view of another embodiment of the clutch of this invention.

A biased roller arrangement is shown in FIG. 18. Here again are circulating rollers in a plurality of individual closed circuits or a serpentine circuit. The axial clutch channels 121, however, are fitted with rails 113 and 122 which are urged peripherally against the rollers 115 and 117 by a spring 114. As shown, a bidirectional clutch having litte backlash is accomplished since the rollers will be biased into the pinch regions 116 and 118 of the clutch channels at all times. The rails 113 may end within the channel 121 or they may perform any part of the return bend or roller return duct function. For one-way control all rails would be biased in the same direction by springs one end of which would abut a side of the clutch channel.

In FIG. 18 the rollers are balls. Ball 115 is active against pinch region 116 and prevents counterclockwise rotation of shaft 119 relative to body 110 with minimum backlash due to the sustained position of readiness in contact with pinch region 116 due to the urging of rail 113 under the influence of spring 114. Ball 115 may return in the circulating loop as 120. Ball 117 prevents rotation of shaft 119 in the clockwise direction, being urged against pinch region 118 as described above for ball 115. Ball 117 may return in the circulation loop through duct 112 as ball 111.

Figure 19:
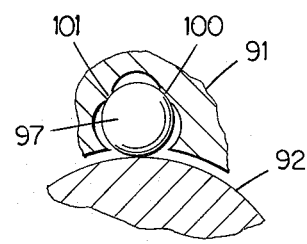
FIG. 19 is a fragmentary sectional view on an enlarged scale of a ball race of the embodiment shown in FIG. 16.

FIG. 19 shows an alternate form of the race 95/96 in FIG. 16. The reference number for ball 97, cage element 91 and shaft 92 relate to FIG. 16. The contact rails 100 and 101 in the cage element 91 contact ball 97. As shaft 92 tends to rotate clockwise ball 97 will apply more load against rail 100 than against rail 101 and a peripheral load will tend to move cage 91 to the right. Clutching action will take place due to the sliding of plane 98. If shaft 92 tends to rotate counterclockwise, the role of rail 100 and rail 101 will reverse urging cage 91 left against planes 89 and the result will be the same. Clutching will occur. This system has advantages in reducing spinning action of the balls and greatly reducing creep of 92 relative to element 91 under torque during high rates of axial movement of shaft 92.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

Liberal use of the term "axial" in this description does not imply that the ball clutch channels must be purely axial. Spiral contours of the clutch channels or portions of the clutch channels may be found to ease entry of rollers into pinch regions and to control non-roll spinning of ball rollers without producing forced rotation between the shaft and clutching device in response to axial motion.

The invention having been described, what is claimed is:

1. A clutch for transmitting torque to a first member having a smooth cylindrical outer surface while allowing axial movement of the member relative to the clutch comprising a housing having an opening through which the first member extends, with its cylindrical outer surface adjacent the side wall of the opening, a plurality of elongated channels of finite length in the side wall of the opening having a longitudinal direction extending in the direction of the longitudinal axis of the member, means to communicate rollers between opposite ends of the channels so that rollers may be endlessly circulated along said channels, a plurality of rollers filling the channels and circulating means so that movement of the rollers in contact with the surface of the member along the channels induces a generally sympathetic movement in all the rollers, a surface of said channel having a contour which allows rollers to move along the surface of the member in contact with the surface of said member and the surface of said channel in a direction of the axis of the member, the transverse contour of the surface of the channels shaped to pinch the rollers against the member if the rollers move in at least one peripheral direction about the member relative to the channel to cause a load vector through the pinched roller to have a peripheral component to resist rotation of the member relative to the housing while allowing the rollers to move longitudinally along the channel with reasonable freedom to permit axial movement of the member relative to the housing.

2. The clutch of claim 1, the housing having adjustment means to alter the radial distance of the channel surfaces from the centerline of the first member to enable the clutch to accept and grip cylindrical members of various diameters.

3. The clutch of claim 1 in which the housing includes an outer member and a plurality of inner members disposed about the first member, each inner member comprising a longitudinal channel opening in the general direction of the centerline of the first member and a ball communication means to communicate balls from one end of the channel to the opposite end of the channel external of the channel, a plurality of balls to fill each channel and communication means, the inner members being axially moveable within the outer member, such axial movement being controlled by a radial adjustment means which urges the inner member channel to move toward the first member centerline in response to axial motion in one direction of the inner member relative to the outer member and urges the inner member channel away from the centerline of the first member upon moving axially in the opposite direction, further having peripheral control means to urge the inner member channel toward the centerline of the first member when the inner members tend to move peripherally relative to the outer member for the purpose of providing a clutch that may adjust to a variety of first member diameters yet remain in contact with the surface of the first member to respond more quickly and more certainly to the tendency of the first member to rotate relative to the clutch yet permit axial movement of the first member.

4. The clutch of claim 3 in which the inner members may be individually removed intact from the outer member and readily replacable within the outer member opening, allowing large couplings or other irregularities in the shape of the first member to move through the opening of the outer member reducing the time required to dismantle and reactivate the clutch.

5. The clutch of claim 1, the surfaces of the channels having a transverse contour such that a ball on the surface of said first member will contact the surface of the channel at two load bearing points to prevent peripheral movement of the ball and cause the ball to apply an increased load on one of the points and decreased load on the other point as said first member tends to rotate, the non-radial compressive load vector between the point of contact between the ball and the first member and the point of contact between the ball and the point of increased load on the channel tending to oppose the rotational tendency of the first member, the contact between the ball and the point of decreased load on the channel surface serving to reduce the tendency of the ball to spin about a line between the two more loaded points on the surface of the ball, the balls being free to move axially along said channel.

6. The clutch of claim 1, said channels having a transverse surface contour such that a radial load is maintained on the balls in the channel urging said balls into contact with the surface of the first member radial load causing the balls to move peripherally relative to the channel in rolling contact with the surface of the first member and the surface of the channels when the first member tends to rotate, said channel surfaces further having an abutment opposing the balls tending to move peripherally, the resistance to continued peripheral movement of the balls being transmitted to the surface of the first member through friction and radial loading, to prevent rotation of the first member with resistive effort being proportional to the imposed radial load upon the balls taking advantage of the resilience of the balls while allowing balls to roll along said channels whereby the first member may move axially.

7. A clutch for transmitting torque to a first member having a relatively smooth cylindrical surface while allowing movement of the member relative to the clutch in a direction of the axis of the cylindrical surface comprising; a housing having a contoured sidewall adjacent the cylindrical surface, at least one channel formed in said contoured sidewall opening toward the cylindrical surface and extending in a direction generally parallel said axis said channel surfaces shaped such that a roller may move longitudinally between said sidewall and the cylindrical surface, the transverse shape of said channel having a diminishing distance between said channel surface and said cylindrical surface in at least one transverse direction which will tend to pinch a roller between said surfaces if said roller tends to move peripherally about said axis relative to said clutch such that a load vector through said roller will have a component perpendicular to said surface and a component tangent to said surface, means to endlessly circulate rollers axially along said channel, a plurality of rollers filling said channel and circulation means, the axial movement of rollers along the channels allowing the member to move axially relative to the clutch, the pinching action imposed upon rollers in the channel tending to move peripherally serving to transmit torque between the clutch and the member.

8. The clutch of claim 7 in which said channel has a transverse surface contour such that said rollers moving in one peripheral direction about the member relative to the housing encounter clearance where they can clear the surface of the member, allowing the member to move in one direction of rotation and in axial directions relative to the housing.

9. The clutch of claim 7, in which said housing includes radial adjustment means to change the radial distance of said channel surfaces from the centerline of said cylindrical surface to enable the clutch to accept and clutch members of various diameters.

10. The clutch of claim 7 in which the housing includes a roller control means capable of movement relative to said channels to control peripheral movement of said rollers as they move relative to said channels.

11. The clutch of claim 10 in which said roller control means includes said roller circulation means.

12. The clutch of claim 10, the housing having adjustment means to alter the radial distance of the channel surfaces from the centerline of the first member to enable the clutch to accept and grip cylindrical members of various diameters.

13. The clutch of claim 10 in which means is provided to selectively control motion of said roller control means relative to said channels such that said rollers may be selectively constrained against peripheral motion within the channels so that clutching of the cylindrical member may be selectively withheld in at least one rotational direction.

14. The clutch of claim 13 in which the means to selectively control the relative motion between the roller control means and the channels further includes drag means to transmit actuating force to said control means from said member when said member moves relative to said housing.

15. The clutch of claim 13 having drag means responsive to the direction of motion of said member relative to said housing to execute said selective constraint.

* * * * *